United States Patent

[11] 3,608,030

| [72] | Inventor | Howard Tint |
| | | 1731 Tyson Road, Havertown, Pa. 19083 |
| [21] | Appl. No. | 826,670 |
| [22] | Filed | May 21, 1969 |
| [45] | Patented | Sept. 21, 1971 |
| | | Continuation of application Ser. No. 567,247, Aug. 31, 1966, now Patent No. 3,458,621. |

[54] A METHOD OF PREPARING A TABLET DOSAGE-FORM FOR THE IMMUNIZATION OF THE INTESTINAL TRACT WITH LIVE VIRUS PREPARATIONS
1 Claim, No Drawings

[52] U.S. Cl. .................................................. 264/113, 264/120, 264/129, 424/2, 424/16, 424/35, 424/89
[51] Int. Cl. ................................................... A61k 9/00, A61k 27/00
[50] Field of Search ............................................. 424/16, 35, 89, 93; 264/113, 120, 129

[56] References Cited
UNITED STATES PATENTS

| 3,048,526 | 8/1962 | Boswell | 424/21 |
| 3,096,248 | 7/1963 | Rudzki | 424/35 X |
| 3,146,169 | 8/1964 | Stephenson et al. | 424/19 X |
| 3,317,393 | 5/1967 | Chanock et al. | 424/93 |
| 3,458,621 | 7/1969 | Tint | 424/2 |

Primary Examiner—Shep K. Rose
Attorneys—Andrew Kafko, Arthur V. Puccini

ABSTRACT: A process for preparing an oral dosage-form suitable for the immunization of the intestinal tract with live virus preparations, which process comprises mixing live virus with a pharmaceutically acceptable excipient, compressing the resulting mixture into a coherent tablet, thereafter compressing a pharmaceutically acceptable excipient about the previously formed tablet in an encasing layer to form a coherent shell having a wall thickness of at least 0.03 inches, and finally completing covering the resulting composite tablet with an enteric coating. The oral dosage-form provided by the method assures the avoidance of undesirable release of live virus in the buccal cavity or the upper intestinal tract, which may result in direct infection in the upper respiratory areas.

A METHOD OF PREPARING A TABLET DOSAGE-FORM FOR THE IMMUNIZATION OF THE INTESTINAL TRACT WITH LIVE VIRUS PREPARATIONS

This application is a continuation of Ser. No. 567,247 filed Aug. 31, 1966, now U.S. Pat. No. 3,458,621.

The invention relates generally to virus-containing compositions intended for causing immunization upon administration. More particularly, the invention relates to an improved dosage-form for the immunization of the intestinal tract with live virus preparations, and to a method for preparing said dosage-form.

For many years it has been known that it is sometimes possible to protect against viral diseases by immunizing the individual via oral administration of the homologous virus, usually attenuated beyond the ability to cause clinical disease. The principal of immunization against poliomyelitis by the use of Sabin vaccine is a case in point.

However, contrary to the Sabin system, where the immunization route is comparable to the path of natural infection; it has also been known that one can immunize by infecting the intestinal tract with a virus which normally primarily affects other susceptible regions. Thus, adenovirus types will infect the small intestine as well as the respiratory tract, and a vaccination may be accomplished by bypassing the respiratory tract to liberate the virus in the small intestine and to produce an immunization thereby.

The principal referred to immediately above has been known for at least a number of years and, in fact, dosage-forms that would accomplish this purpose have already been prepared and used. These dosage-forms consisted of liquid or dried, viable adenovirus (several types) in capsules which were in turn enclosed in a second capsule, and the latter were eventually coated with the usual enteric preparations of the pharmaceutical art. A system has been described in a preliminary publication which appeared in the "Annual Review of Respiratory Diseases," 83:394–403. A system based upon an enteric capsule containing lyophilized virus is described in a later and more detailed publication which appeared in the "Journal of the American Medical Association," 195:45–459, 1963. As disclosed in said publications, preparation of the known dosage-forms has been limited to the gelatin encapsulation technique referred to therein.

Use of the forgoing technique had appeared, up to the time of the present invention, to be necessary to the only feasible dosage-forms for the demonstration of said immunization principal. However, said technique and the resulting dosage-forms have been found to have many inherent drawbacks and disadvantages. Most seriously, the known double-encapsulated dosage-forms have been found not to guard against the inadvertent release of live virus during the enteric coating operation, whereby the exterior surface of the enteric coat has been found to be contaminated. Thus, there are involved the dangers of loss of virus titers and, more importantly, the possibility of infection in the buccal cavity and/or the upper intestinal tract, thereby to risk direct infection in the upper respiratory areas, rather than to provide immunization at a remote site, according to the aforesaid principal. Although it might be possible to seal the capsules prior to coating, in order to avoid said dangers; this would involve an extremely laborious and time-consuming operation. A further serious disadvantage of said known dosage-forms is that the production thereof requires hand operation and does not lend itself readily to mass production. Thus, there is involved an overriding difficulty of establishing automated equipment for large-scale production of the previously known "capsule-within-a-capsule" forms.

The present invention is based on my discovery of a novel, improved dosage-form that is particularly adapted for the immunization of the intestinal tract with live virus preparations, and which does not have the inherent drawbacks and disadvantages of the known dosage-forms as referred to herebefore.

In its broadest composition aspect, the improved dosage-form of the present invention comprises: an inner pressed tablet containing at least one pharmaceutically acceptable solid excipient and a live virus capable of infecting the intestinal tract; an intermediate pressed layer containing at least one pharmaceutically acceptable solid excipient, said intermediate layer completely encasing said inner pressed tablet and providing a shell which per se has a minimum wall thickness of 0.03 inches; and an outer enteric coating material completely covering said intermediate pressed layer. In its broadest process aspect, the method of the present invention comprises: mixing a batch of live virus with a batch of at least one pharmaceutically acceptable solid excipient; compressing the resultant mixture into coherent tablets; again providing a batch of at least one pharmaceutically acceptable solid excipient; compressing material from said batch about said coherent tablets in an encasing layer to form a shell having a wall thickness of at least 0.03 inches; and then completely covering the resulting larger tablets with an enteric coating. The inner part, or core, of the described dosage-form may be either a compressed tablet of lyophilized material or a compressed tablet of solid material containing adsorbed liquid virus which, as a whole, is capable of compression. The latter includes semidry material obtained by adsorbing virus-containing fluids on sugar or resins, for example.

Amongst the inherent advantages stemming from the exercising of the present invention are the following: The interposition of an inert press-coat (outer layer) around the active core (inner tablet) provides a barrier against the inadvertent release of live virus during the enteric coating operation, which might contaminate the exterior surface of the enteric coat. That is, the inert press-coat surrounding the active core provides a physical barrier to the accidental loss of virus-containing fragments from the core in the process of applying the enteric coat, thereby insuring against accidental contamination of the buccal surfaces and upper respiratory tract during administration.

In this connection, the viruses referred to can be acid labile, and the enteric coating of the press-coated nucleus further assures that the virus gets through the stomach without loss of titer. As also referred to previously, the double capsule of the prior art provides no guarantee in this regard, as has unfortunately already been demonstrated by actual experience. The press-coat (outer layer) around the active core (inner tablet) in accordance with the invention prevents any deleterious effect upon the virus titers which might result from the solvents which are normally used for applying enteric coats. The protection of the press-coat serves to preserve the integrity of the core during the actual administration by the oral route and against damage from instruments, teeth and the like. Finally, whereas the known encapsulated dosage-forms require hand-operation and do not lend themselves readily to mass production, as referred to hereinbefore; the enteric-covered press-coated tablet of the invention may be made easily with available equipment, on a mass scale.

The successful production of an oral dosage-form, in accordance with the invention, is particularly surprising in consideration of the preexisting theoretical prejudices which arise from the otherwise popular supposition that there would be significant heat destruction of the virus during the double pressing of the tablet form. Surprisingly, this has been found not to occur.

The following example illustrates the press-coated tablet dosage-form of the invention, and mode of preparation, in greater detail.

EXAMPLE

I. PREPARATION OF LYOPHILIZED VIRUS

A. 6,000 ml. of a lot of adenovirus type IV, identified as OPL No. 10, were filtered in accordance with standard procedures.

B. The following additives were then admixed into the filtered lot:

| Component | Amount |
|---|---|
| (1) 20 percent skim milk autoclaved at 10 lb. for 10 min. | 1,500 ml. |
| (2) 5 percent gelatin USP, autoclaved at 15 lb. for 15 min. | 120 ml. |
| (3) 5 percent human serum albumin | 72 ml. |

C. The resultant virus-containing mixture was then subjected to lyophilization by the known tray-dried techniques to give 344 g. total weight lyophilized material. Thus, 1 ml. of the original virus fluid was present in each 57.3 mg. of lyophilized material.

II. PREPARATION OF DOSAGE-FORM LOTS

A. Blending prior to Compression 334.25 g. of lyophilized solids obtained in I. C. above, and representing 5,833 cc. original adenovirus type IV fluid, were blended with a mixture containing 350 g. of microcrystalline cellulose, 4.4 g. magnesium stearate and 885.4 g. lactose.

B. Initial Compression 459 g. of the mixture obtained in A. immediately above were compressed in standard tableting apparatus to yield 5,100 tablets, each weighing 90 mg. and having cylindrical dimensions equivalent to 0.250 inches diameter and 0.113 inches high. (Each tablet contained 19.1 mg. of lyophilized solid, or the equivalent of one-third cc. of the original fluid.)

C. Second Compression

Of the 5,100 tablets obtained in B. above, 2,500 tablets were subsequently press-coated by compressing about each tablet a mixture comprising 288.7 mg. of lactose, 0.9 mg. magnesium stearate, and 72.4 mg. microcrystalline cellulose to yield 2,500 press-coated (or "tablet within a tablet") tablets, each weighing 452 mg. and having cylindrical dimensions equivalent to 0.375 inches in diameter and 0.212 inches high.

D. Enteric Coating

1. An enteric coating solution was prepared by admixing a batch having the following composition:

| Component | Percent |
|---|---|
| Cellulose acetate hydrogen phthalate | 10 |
| Castor Oil | 0.25 |
| Acetone | 44.75 |
| Absolute ethanol | 45 |

2a. The 2,600 nonpress-coated tablets were coated by using conventional pan coating techniques which comprised keeping the tablets dipped in the coating composition for 2 hours at room temperature. Each tablet was coated with approximately 6 mg. (dried weight) enteric coating material.

b. The 2,500 press-coated tablets were similarly coated by using the same conventional pancoating techniques utilized in (2a) above. Each of these tablets were coated with approximately 25 mg. (dried weight) enteric coating material.

E. Storage

Prior to use, the tablets were stored at 5° C.

F. Testing

1. Following the in vitro disintegration procedures as described in the USP XVI, both the enteric coated non-press-coated tablets obtained in D. (2a) above and the enteric coated press-coated tablets obtained in D. (2b) above withstood artificial gastric juice for a minimum of 4 hours at 37° C., yet disintegrated in simulated intestinal fluid at 37° C. within 25 minutes. Thus, it was demonstrated that the dosage-form of the invention (and its inherent advantages with respect to undesirable virus migration or escape) is obtained without sacrifice of its ultimate function in the gut.

2. The superior results in antibodies titer obtained with the use of the press-coated dosage form of the invention was demonstrated by a comparison of serologic data as given in the table below:

TABLE.— NEUTRALIZING ANTIBODY RESPONSES FOLLOWING ADMINISTRATION OF LIVE TYPE 4 ADENOVIRUS CONTAINED IN ENTERIC-COATED TABLETS

| Type tablet | Initial neutralizing antibody titer | Number men | Number with 4-fold rise in neutralizing antibody [1] | | Geometric mean titer | |
|---|---|---|---|---|---|---|
| | | | 11 days | 15 days | 11 days | 15 days |
| Press coated | <4 | 13 | 13 (100) | 13 (100) | 19.8 | 115.4 |
| | 4 or > | 11 | 4 (36) | 7 (64) | 16.0 | 141.1 |
| Non-press coated | <4 | 20 | 10 (50) | 14 (70) | 10.6 | 26.2 |
| | 4 or > | 4 | 1 (25) | 1 (25) | 32 | >256 |

[1] Values in parentheses are percentages.

As can be seen from the foregoing, the dosage form of the invention successfully elicited an antibody response in the antibody-negative individuals to which it was given, and resulted in an appreciably greater magnitude of titer rise; whereas the nonpress-coated tablets no only failed to elicit an antibody response in all the antibody-negative individuals, but, in addition, the magnitude of the titer rise was significantly smaller.

G. Use in Immunization

The tablets were administered orally to persons susceptible to infection by adenovirus. Immunity from such infection for a 6-week observation period was obtained. Moreover, examination of so-immunized persons revealed no detectable shedding of the adenovirus from the upper respiratory areas. On the other hand, virus was shed from the intestine, indicating that the infection at that remote site had occurred.

While a preferred embodiment of the novel dosage-form of the invention and its mode of preparation have been disclosed for purposes of illustration, it will be evident to those skilled in the art that various changes and modifications may be made therein without departing from the scope and spirit of the invention. Merely by way of example, it will appear at once that the virus which can be incorporated in the press-coated tablets of the invention may be influenza, parainfluenza, rhinoviruses and other viruses whose primary infection site is not the intestine. Excepients known to the art, other than those of the example may be substituted in whole or in part, as may also be the enteric coating composition. The tablet dimensions (both inner and outer) may be varied according to circumstances. Further, with the efficacy of the intestinal infection for vaccination for a given virus being established; the administration of the virus to infants, or others for which oral administration may be a problem, may be by way of a suppository. In such case, the enteric coating might be omitted. As will also be understood, the particular virus which is first lyophilized or otherwise processed prior to being incorporated ultimately into the dosage-form of invention may be prepared and/or incubated by conventional procedures known in the art.

I claim:
1. A method for preparing a live virus dosage-form with a safety feature advantageous with respect to undesirable virus migration or escape, said dosage-form being suitable for the immunization of the intestinal tract with live virus preparations, said method comprising: mixing a batch of live virus capable of infecting the intestinal tract, whose primary-infection site is not the intestinal tract, and may be the upper respiratory tract, with a batch of at least one pharmaceutically acceptable solid tableting excipient; compressing the resultant mixture into coherent pressed inner core tablets; providing a batch of at least one pharmaceutically acceptable solid compression coating excipient; compressing material from said batch about said coherent pressed inner core tablets in a completely encasing layer, to form a coherent safety shell about each of said coherent pressed inner core tablets having a wall thickness of at least 0.03 inches, thereby providing a physical barrier to accidental losss of virus and virus-containing fragments from the core in the process of applying the enteric coat, said safety shell thereby insuring against accidental virus contamination of the outer enteric coating during manufacture and of the upper respiratory tract and buccal surfaces during administration; and then completely covering the resulting larger safety shelled tablets with an outer enteric coating.

PO-1050
(5/69)

UNITED STATES PATENT OFFICE
CERTIFICATE OF CORRECTION

Patent No. 3,608,030   Dated   September 21, 1971

Inventor(s) Howard Tint

It is certified that error appears in the above-identified patent and that said Letters Patent are hereby corrected as shown below:

Front page, in the left-hand column, between lines 3 and 4 there should appear the item -- [73] Assignee American Home Products Corporation, New York, New York --.

Column 4, line 43, "no" should read -- not --;
line 65, "Excepients" should read -- Excipients --.

Column 5, line 9, after the word "pharmaceutically", there should be a hyphen;
line 12, after the word "pharmaceutically", there should be a hyphen.

Column 6, line 5, the word "losss" should read -- loss --.

Signed and sealed this 13th day of June 1972.

(SEAL)
Attest:

EDWARD M. FLETCHER, JR.
Attesting Officer

ROBERT GOTTSCHALK
Commissioner of Patents